May 2, 1939.　　　　C. C. COONS　　　2,156,912
ABSORBER FOR REFRIGERATING SYSTEMS
Filed May 27, 1935　　　2 Sheets-Sheet 1

INVENTOR
Curtis C. Coons
BY
Harry S. Demaree
ATTORNEY

Patented May 2, 1939

2,156,912

UNITED STATES PATENT OFFICE 2,156,912

ABSORBER FOR REFRIGERATING SYSTEMS

Curtis C. Coons, North Canton, Ohio, assignor to The Hoover Company, North Canton, Ohio, a corporation of Ohio Application May 27, 1935, Serial No. 23,628

25 Claims. (Cl. 62—119.5)

This invention relates to absorbers for continuous absorption refrigerating systems of the type in which an inert gas is employed and more particularly to means for circulating fluids therein.

It is an object of the present invention to provide improved means for circulating the fluids in the absorber of an absorption system.

It is a further object of the invention to provide fluid circulating means, which may be hermetically sealed in an absorber of an absorption refrigerating system, and which in addition to causing both a gas and a liquid to flow in the desired direction, brings the gas and liquid into very intimate contact and splashes or throws them about the inner wall of the absorber so as to enable the heat of absorption to be rapidly discharged. This object is attained in a particularly advantageous manner if a number of eddy currents are set up in both the gas and the liquid passing through the absorber.

It is another object of the invention to provide an absorber for a refrigerating system with power driven means which may be hermetically sealed therein and which causes liquid to flow upwardly through the absorber while contacting with the gas to be absorbed at a number of places.

Other objects reside in certain novel features of the arrangement and construction of parts as will be apparent from the following description taken in connection with the accompanying drawings in which.

Figure 1:
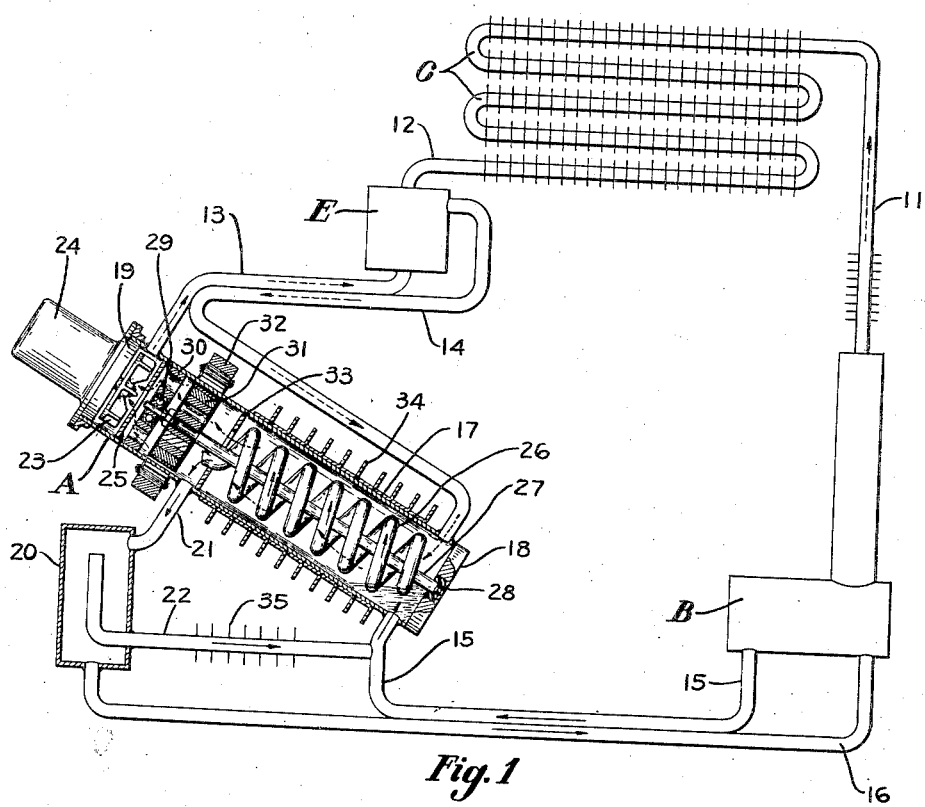
Figure 1 is a diagram illustrating a complete absorption refrigerating system with the absorber thereof shown in vertical cross section and somewhat in detail, the arrangement showing one embodiment of the invention.

Referring to the drawings in detail and first to the arrangement illustrated in Figure 1, it will be seen that a continuous absorption refrigerating system is illustrated as consisting of a boiler B, a condenser C, an evaporator E and an absorber A connected together in a more or less conventional manner. The boiler B is connected to the condenser C by means of a conduit 11, a portion of which may act as a rectifier so that when heat is applied to the boiler, refrigerant gas will flow through the pipe 11, condense in the condenser C and be fed into the evaporator E through the conduit 12. The evaporator E is connected to the absorber A by means of two gas conduits 13 and 14 which may be in heat exchange relation and which form a circuit for the flow of inert gas and refrigerant vapor between the evaporator and the absorber as will be explained hereinafter.

The boiler B is connected to the absorber A by means of two liquid conduits 15 and 16 which may be in heat exchange relation.

The main vessel of the absorber A illustrated in Figure 1 consists of a cylinder 17 disposed in an inclined position and provided with end pieces or heads 18 and 19. A small auxiliary vessel 20, which may be regarded as a part of the absorber, is located a slight distance below the main vessel 17 and is connected thereto by a short pipe 21 at its upper end. An additional pipe 22 which extends into the upper portion of the vessel 20 connects it to pipe 15 just below the point where this pipe enters the lower portion of the vessel 17. The conduit 16, mentioned above, is connected to the lower portion of the small auxiliary vessel 20.

By means which will presently be described, absorption liquid is lifted or pumped in the main absorber vessel 17 from a pool formed in the lower end thereof near the point of connection of the conduit 15, upwardly through the vessel and conveyed into the pipe 21. When liquid is so pumped it flows in two cycles, one being from the vessel 17 through the pipe 21, the small auxiliary chamber 20, the conduit 16, the boiler B, the conduit 15 back to the vessel 17 while the other is from the vessel 17 into the vessel 20, through the conduit 21 in which the liquid level is such that a certain amount will overflow into the pipe 22 and be conveyed back through the pipe 15 without going through the boiler B. In order to regulate or maintain the proper flow through the boiler and through the by-pass pipe 22, valves or restrictions (not shown) may be placed in the pipes 16 or 22 if desired, but if the pumping means in the absorber is driven at the proper speed such restrictions will not be necessary since the regulation of flow will be automatic.

As has been indicated above, means is provided for circulating inert gas and refrigerant vapor through the absorber vessel 17, the evaporator E and the conduits 13 and 14. For this purpose a fan 23 is mounted in the upper portion of the absorber vessel 17 and is driven by a hermetically sealed motor of any suitable construction, as illustrated at 24. A baffle plate 25 may be mounted just beneath the centrifugal fan 23 to provide a fan eye therefor, and this fan may discharge directly into the conduit 13, as illustrated. Since the conduit 14 is connected to the lower end of the vessel 17 the fan 23 will create a circuit for inert gas between this vessel and the evaporator, the flow being in the direction of the arrows shown in dashed lines.

For lifting absorption liquids from the lower portion of the vessel 17 up to the point of connection of the conduit 21, a coil of pipe 26 is mounted within the absorber vessel 17 for rotation upon a longitudinally extending shaft 27. The shaft 27 is supported in a lower bearing 28 in the end plate 18 and in an upper bearing 29 supported by a spider 30, located just below the fan 23. For driving the shaft 27 an armature 31 is secured thereto, the armature being caused to rotate by an electromagnet 32 on the outside of the absorber vessel. The armature 31 has holes therein to permit the passage of gas through it.

As the spiral pipe 26 is rotated by the shaft 27 liquid will be picked up at the lower end thereof and be gradually conveyed upwardly and discharged from the upper end of the pipe above the plate 33, this pumping action being the same as that in an Archimedes spiral.

In addition to lifting the liquids as just described, however, the spiral 26 performs other very valuable functions in the arrangement illustrated. As the spiral rotates liquid also clings or adheres to the outer wall of the pipe and is gradually lifted up thereby dripping off at various points upon the lower side of the absorber vessel. This liquid is thus in constant contact with the inert gas and refrigerant vapor flowing through the vessel 17. Furthermore, as the liquid passes upwardly through the interior of the pipe 26 it is in constant contact and is intimately mixed with gases inside of the pipe 26, it being well known that in Archimedes spiral pump the liquid occupies only the lower portion of these convolutions, so that this pipe has alternate slugs of liquid and gas therein. Thus independently of the fan 23 inert gas and refrigerant vapor constantly passes in an eddy current through the pipe 26 so that it is intimately mixed with the liquid both in the pipe 26 and on the outside thereof.

The speed of rotation of the shaft 27 may be varied as desired, and even though it is quite slow considerable liquid may be pumped thereby and more than enough to create the proper circulation between the absorber vessel 17 and the boiler. The local solution circuit through the pipe 22 thus enables the pump to bring the absorption liquid into contact with the gases in the vessel 17 over and over again, and at the same time enables the solution to be cooled not only by the heat radiating fins 34 upon the vessel 17, but by means of the fins 35 on the pipe 22 also.

It is within the purview of the invention to dispense with the auxiliary vessel 20 and the conduit 22 and connect the pipe 16 directly to the pipe 21, but inasmuch as certain advantages are gained by recirculating the absorption liquid before it returns to the boiler, the use of such a vessel is preferred. If the vessel 20 is eliminated the shaft 27 may still be rotated at a sufficiently high speed that some liquid would overflow the opening in the plate 33 so as to be recirculated through the pipe 26. On the other hand the shaft might be rotated so slowly that all of the liquid lifted through the coil 26 would flow through the boiler B.

Figure 2:
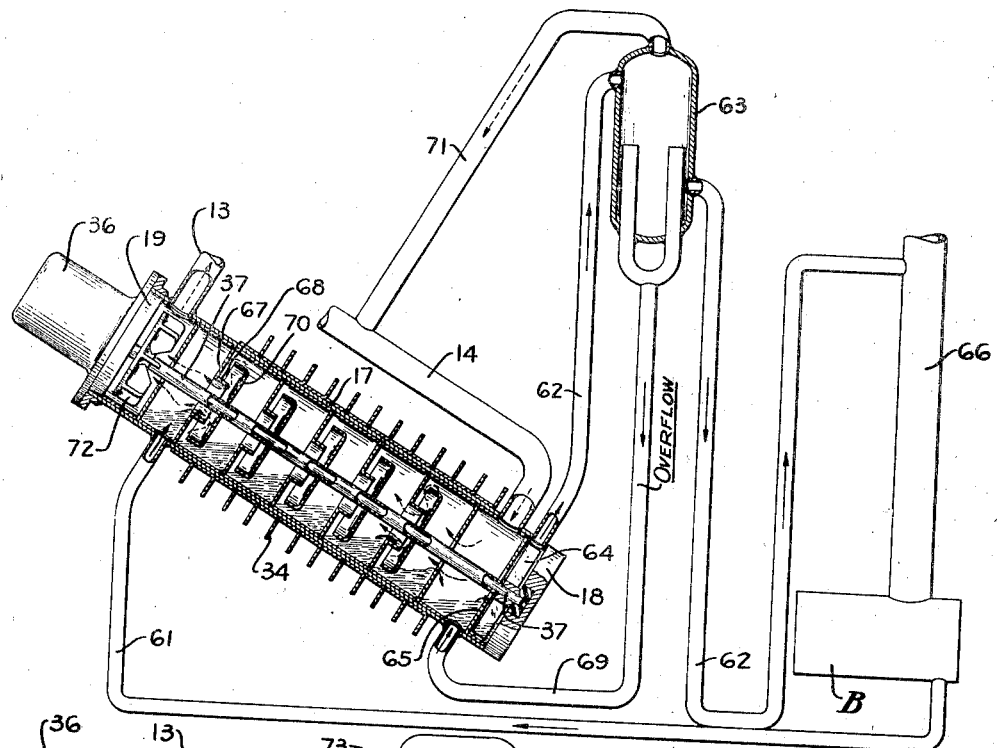
Figure 2 is a side view of an absorber and a boiler adapted to be substituted for the absorber and boiler illustrated in Figure 1, the absorber and an associated vessel being shown in vertical cross section.
Figure 3:
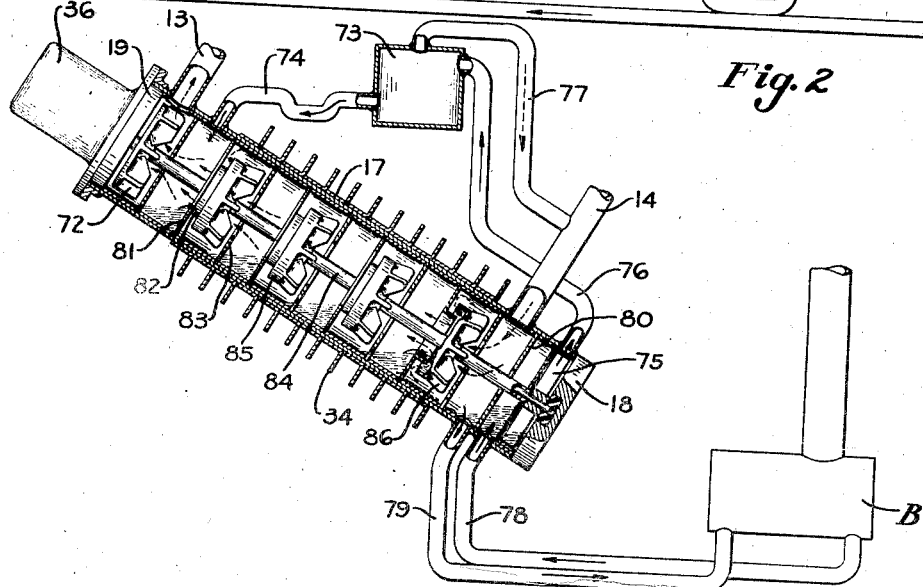
Figure 3 is a view similar to that of Figure 2, but with a different form of absorber shown in vertical cross section.

As indicated above, an important feature of the present invention involves the provision of means for conveying absorption liquid upwardly through the absorber vessel in contact with the gas to be absorbed. In Figure 1 just described, this absorption liquid passes upwardly through the interior of the main absorber vessel. It is within the purview of the invention, however, to provide an auxiliary absorber vessel, pump the gas and liquid to this auxiliary vessel, and allow the liquid to flow therefrom through the main absorber vessel by gravity. Figures 2 and 3 illustrate different embodiments of the invention in which such an auxiliary vessel is employed.

In the arrangement of Figure 2 a main absorber vessel 17 is illustrated as connected to the boiler B by means of two conduits 61 and 62, the conduit 62 including in its path a small auxiliary absorber vessel 63 located at some distance above the main absorber vessel 17.

In the main absorber vessel 17 an electric motor 36 drives the shaft 37 which carries at its lower end a centrifugal fan or pump 64, adapted to convey both gas and liquid into the auxiliary absorber vessel 63. A small plate 65 with a centrally located opening is disposed above the rotating blades of the fan 64 so as to provide a fan eye therefor.

Liquid lifted into the auxiliary absorber vessel 63 flows by gravity into the standpipe 66 above the boiler which standpipe may be provided with baffle plates so as to cause it to act as an analyzer or rectifier. From standpipe 66, the liquid flows by gravity through the main body of the boiler B, through the conduit 61 into the upper portion of the main absorber vessel 17, downwardly over the baffle plates 67 which have depending flanges 68 thereon, and back to the pump 64 to complete its cycle. Any excess of liquid carried into the auxiliary vessel 63 will flow back into the absorber through the conduit 69 so as to be recirculated and again brought in contact with the gases therein.

As the liquid flows downwardly through the main absorber vessel 17 it will form a number of pools above the baffle plates 67 and liquid from these pools as well as that which drips off of the flanges 68 on the baffle plates will be splashed around the interior of the absorber vessel by means of the rotating discs 70, which may be provided with flanges as shown. Since the discs 67 and the rotating elements are disposed in parallel relation, liquid is not conveyed upwardly through the main absorber vessel 17 thereby. Lifting of liquid is accomplished by the pump 64 at the lower end of this vessel.

Inert gas and refrigerant vapor entering the absorber vessel 17 of Figure 2 through the conduit 14, divides into two streams, one stream passing into the fan 64 upwardly into the auxiliary absorber vessel 63 and then back to the conduit 14, through a conduit 71 connecting this conduit to the top of the auxiliary vessel 63. This inert gas and refrigerant vapor stream thus describes a local circuit.

The main body of inert gas and refrigerant vapor, together with a portion of that which has passed through fan 64, enters the absorber vessel 17 through the conduit 14 and passes upwardly therethrough coming in very intimate contact with the spray of liquid thrown off from the rotating discs 70, the gas passing between these discs and the depending flanges 68 on the baffle plates 67. The gas then leaves the absorber vessel 17 through the inert gas conduit 13 under the influence of a fan 72 mounted on the upper end of the shaft 37.

The provision of the auxiliary vessel 63 and the associated conduits has an advantage over the arrangement illustrated in Figure 1 in that additional cooling may be provided by placing heat radiating fins (not shown), or other cooling devices on this vessel and the associated conduits.

Under some circumstances it is advisable to cause the absorption liquid to flow from the small auxiliary absorber vessel directly into the main absorber vessel without passing through the boiler as in the arrangement in Figure 2. Thus in the arrangement of Figure 3 the small auxiliary absorber vessel 73 located above the main absorber vessel 17 has a conduit 74 which drains the vessel 73 directly into the top of the absorber vessel 17.

Liquid and gas are lifted from the lower end of the absorber vessel 17 into the vessel 73 by means of a fan or pump 75 which may be identical with the similar structure 64 of Figure 2, the pump 75 discharging into a conduit 76 connected to the top of the vessel 73.

Inert gas and refrigerant vapor carried into the vessel 73 in this way passes through a conduit 77 connected to the main inert supply conduit 14, it thus passing in a local cycle like that described above in connection with Figure 2.

The lower portion of the absorber vessel 17 is connected to the boiler B (which may be located some distance below the vessel 17 to form what is called a submerged boiler) by means of two conduits 78 and 79 which may be in heat exchange relation and which are connected to the lower end of the absorber vessel 17 only a short distance apart. Liquid is caused to flow through the conduit 79, the boiler B and the conduit 78 back to the absorber vessel by means of a baffle plate 80 located between the two points of connection of conduits 78 and 79. This plate 80 acts as a dam for creating a difference in liquid levels between the two pools formed adjacent the conduits 78 and 79. By varying the spacing between these conduits and by moving the plate 80 up or down the quantity of liquid circulated through the boiler B may be controlled. Any liquid which does not flow through this circuit spills over the opening in the plate 80 and is lifted by the pump 75 back to the upper part of the absorber so that this portion passes in a local circuit. As in the arrangement of Figure 2 the main portion of the absorption liquid is lifted upwardly by the pump 75 and after passing through the vessel 73 and the conduit 74 trickles downwardly through the interior of the main absorber vessel, a number of pools being formed and the liquid passing through openings in baffle plates and splashed about by rotating elements. In the arrangement illustrated in Figure 3 the rotating elements do not dip into the pools of liquid formed, but the splashing action is attained by causing the liquid to drip off the baffle plates on to the rotating elements.

In the arrangement of Figure 3 baffle plates 81, having depending flanges 82 thereon, are alternated with baffle plates 83, which do not have any depending flange and which are provided with an opening at their lower edge to allow liquid to pass thereunder. The rotating elements mounted on the shaft 84 consists of a cup-shaped disc portion 85 which may be similar to the disc 70 of Figure 2, and an integral centrifugal fan element. These fans 86 not only assist the fan 72 located in the top of the absorber vessel 17 to cause inert gas and refrigerant vapor to flow upwardly through the absorber vessel and leave it through the inert gas conduit 13, but also cause inert gas and refrigerant vapor between each set of baffle plates 81 and 83 to be thrown outwardly with considerable impact in contact with the spray of liquid thrown off from the discs 85. By this intimate contact effective absorption is obtained and the heat of absorption is readily conducted to the heat discharging means on the outside of the absorber vessel. As in the arrangement of Figure 2, heat discharge means may also be provided on the vessel 73 and the connecting conduits so as to provide a large heat radiating surface.

From the above description it may be obvious that the invention may be carried out in a number of ways. Various other changes not illustrated will be apparent to those skilled in the art without departing from the spirit of the invention or the scope of the annexed claims.

I claim:

1. An absorber adapted for use in an absorption refrigerating system employing inert gas as a pressure equalizing medium, said absorber having a main part and an auxiliary part and an arrangement in the main part for causing an inert gas and refrigerant vapor mixture and absorption liquid to flow through the same and for bringing the same in intimate contact, said arrangement including a combined liquid and gas pump, means for bringing absorption liquid and the inert gas refrigerant vapor mixture to said pump and means for conveying liquid and gas from said pump to said auxiliary part at a level above the absorber, from which the liquid may flow through the main part under the influence of gravity.

2. An absorber adapted for use in an absorption refrigerating system employing inert gas as a pressure equalizing medium, said absorber having a main part and an auxiliary part and an arrangement in the main part for circulating the absorption liquid through said parts in series and for bringing the same into intimate contact with the gas, said arrangement including means for circulating an inert gas refrigerant vapor mixture through said main part of the absorber in contact with the absorption liquid and means for circulating a portion of the inert gas refrigerant vapor mixture in a separate circuit through said auxiliary part of the absorber.

3. An absorber adapted for use in an absorption refrigerating system employing inert gas as a pressure equalizing medium, said absorber having a main part and an auxiliary part and an arrangement in the main part for causing an inert gas refrigerant vapor mixture and absorption liquid to flow through the same and for bringing the same in intimate contact, said arrangement including means for circulating the gas through said main part of the absorber in contact with the absorption liquid and means for circulating a portion of the inert gas in a separate circuit through said auxiliary part of the absorber, said last mentioned means including a combined liquid and gas pump hermetically sealed in the main part of the absorber.

4. An absorber adapted for use in an absorption refrigerating system employing inert gas as a pressure equalizing medium, said absorber including a vessel, means for supplying absorption liquid to the lower part of said vessel, means for supplying inert gas and refrigerant vapor to the lower part of said vessel, means for causing some inert gas and refrigerant vapor to flow upwardly through said vessel, pumping means for conveying absorption liquid from the lower part of said vessel to the upper part thereof and means for causing some inert gas and refrigerant vapor to flow into said pumping means to intimately mix with the absorption liquid therein and flow with said liquid over at least a portion of its path.

5. An absorber adapted for use in an absorption refrigerating system employing inert gas as a pressure equalizing medium, said absorber including a vessel, means for supplying absorption liquid to the lower part of said vessel, means for supplying inert gas and refrigerant vapor to the lower part of said vessel, means for causing some inert gas and refrigerant vapor to flow upwardly through said vessel, and pumping means for conveying absorption liquid from the lower part of said vessel to the upper part thereof, the arrangement being such that the liquid pumped into the upper part of said vessel may flow downwardly therethrough by gravity in contact with and in counterflow to the passage of inert gas and refrigerant vapor upwardly therethrough.

6. An absorber adapted for use in a continuous absorption refrigerating system, said absorber including a vessel, means for supplying absorption liquid to the lower part of said vessel, pumping means for causing absorption liquid to flow from the lower part of said vessel to the upper part thereof, means for supplying refrigerant gas to be absorbed to the lower part of said vessel, means for dividing the refrigerant gas in said vessel into a plurality of streams, one of which has a path upwardly through the vessel and another of which has a path through said pumping means so that it comes in intimate contact with the liquid therein.

7. An absorber adapted for use in a continuous absorption refrigerating system, said absorber including a vessel, means for supplying absorption liquid to the lower part of said vessel, pumping means for causing absorption liquid to flow from the lower part of said vessel to the upper part thereof, means for supplying refrigerant gas to be absorbed to the lower part of said vessel, and means for causing refrigerant gas to flow upwardly through said vessel, the arrangement being such that the liquid pumped into the upper part of said vessel may flow downwardly by gravity in contact with and counterflow to the passage of refrigerant gas upwardly therethrough.

8. Absorption refrigeration apparatus of the type employing a refrigerant, an absorbent therefor, and a pressure equalizing medium including a boiler, an absorber, and an evaporator, a liquid circuit connecting said boiler and absorber, a gas circuit connecting said evaporator and absorber, and power actuated means within the absorber operable to circulate part of said equalizing medium and refrigerant vapor through the absorber and over said gas circuit, and part of said equalizing medium and refrigerant vapor upwardly through the absorber along with slugs of absorbent fluid and thereafter over said gas circuit, said slugs of absorbent fluid thereafter flowing through the liquid circuit by gravity.

9. Absorption refrigeration apparatus of the type employing a refrigerant, an absorbent therefor, and a pressure equalizing medium including a boiler, an absorber, and an evaporator, a liquid circuit connecting said boiler and absorber, a gas circuit connecting said evaporator and absorber, and power actuated means including a coiled conduit mounted for rotation for circulating the pressure equalizing medium and refrigerant gas over the gas circuit, and for returning the absorbent fluid to said boiler over the liquid circuit, and means for dissipating the endothermic heat of absorption.

10. Absorption refrigeration apparatus of the type employing a refrigerant, an absorbent therefor, and a pressure equalizing medium including a boiler, an absorber, and an evaporator, a liquid circuit connecting said boiler and absorber, a gas circuit connecting said evaporator and absorber, and power actuated means including a coiled conduit mounted for rotation for circulating the pressure equalizing medium and refrigerant gas over the gas circuit and for returning the absorbent fluid to said boiler over the liquid circuit while bringing it into intimate absorbing relation with at least part of said refrigerant gas in said coil.

11. That method of producing refrigeration which includes applying heat to rich absorbent liquid to liberate a refrigerant gas, allowing the refrigerant to evaporate into a pressure equalizing medium after liquifying the same, said method being characterized by the fact that a stream of the resulting gaseous mixture is divided into a plurality of smaller streams, circulating one of said streams in contact with lean absorbent fluid over an extended path, passing another of said streams into intimate contact with but in counter-flow to another body of absorbent fluid, and thereafter returning the enriched absorbent to the heating zone and the pressure equalizing medium to the evaporating zone.

12. An absorber adapted for use in an absorption refrigerating system, comprising a closed vessel disposed in other than a vertical position and having means thereon for air cooling the same, a shaft extending longitudinally within said vessel, hermetically sealed means for rotating said shaft, a plurality of plates having openings therein and arranged to extend transversely across said vessel in spaced relation and a plurality of rotors fixed to said shaft in spaced relation so as to alternate with said plates, means for causing absorption liquid to flow over the plates and rotors in said vessel, by gravity, in sequence, first over a portion of one of said plates and then in contact with one of said rotors to be splashed around the inner wall of the vessel thereby the arrangement being such that pools are formed on portions of said plates, and means for circulating an inert gas laden with a refrigerant gas through said vessel in a direction opposite to the flow of absorption liquid therethrough, the arrangement being such that the liquid and gases are brought into intimate contact as the result of rotation of said rotors and the splashing action resulting therefrom while causing the rapid dissipation of the heat of absorption to said air cooling means as the result of the splashing of the liquid around the inner wall of the vessel.

13. An absorber adapted for use in an absorption refrigerating system comprising an elongated vessel, baffle plates fixed in said vessel, said plates having depending flanges surrounding openings therein, and a rotating device mounted in said vessel having a number of cup-shaped rotating elements thereon, said cup-shaped elements being disposed slightly beneath the depending flanges on said plates whereby liquid may drip from the flanges into said rotating elements and be splashed around the absorber thereby.

14. An absorber adapted for use in an absorption refrigerating system comprising an elongated vessel, baffle plates fixed in said vessel, said plates having depending flanges surrounding openings therein, and a rotating device mounted in said vessel having a number of cup-shaped rotating elements thereon, said cup-shaped elements being disposed slightly beneath the depending flanges on said plates whereby liquid may drip from the flanges into said rotating elements and be splashed around the absorber thereby, said rotating device also including means for circulating gas through said absorber.

15. An absorber adapted for use in an absorption refrigerating system comprising an elongated vessel, baffle plates fixed in said vessel, said plates having depending flanges surrounding openings therein, and a rotating device mounted in said vessel having a number of cup-shaped rotating elements thereon, said cup-shaped elements being disposed slightly beneath the depending flanges on said plates whereby liquid may drip from the flanges into said rotating elements and be splashed around the absorber thereby, said rotating device also including means for circulating gas through said absorber, said gas circulating means including blades mounted integrally with certain of said rotating cup-shaped elements.

16. An absorber capable of use in an absorption refrigeration system comprising a casing having a plurality of apertured, transversely extending partitions therein, a motor driven shaft extending through said apertures and carrying members adjacent thereto, said members having a peripheral lip operable to form a spray of absorption liquid on said members, said members also having means formed to direct a fluid through said spray to be absorbed thereby, and means for supplying an absorption fluid and a fluid to be absorbed to said casing.

17. Absorption refrigerating apparatus comprising a boiler, an absorber, means within said absorber for circulating absorption solution through a circuit including said boiler and absorber and for promoting intimate contact between said solution and a gas to be absorbed, means for rejecting the heat of absorption from said absorber to a body of cooling medium, and means for recirculating a portion of the solution through a local circuit comprising said absorber and a heat rejecting element.

18. That improvement in the art of refrigeration which includes the steps of circulating absorption solution and a pressure equalizing medium refrigerant vapor mixture through an absorption zone to absorb the refrigerant, rejecting the heat of absorption to a body of cooling air, recirculating all absorption solution above a predetermined quantity leaving the absorption zone therethrough, and air cooling the recirculated absorption solution.

19. Absorption refrigerating apparatus comprising a boiler, an absorber, means forming an absorption solution circuit including said boiler and absorber, means within said absorber for conveying absorption solution through said circuit, and means for regulating the quantity of absorption solution conveyed through said circuit independently of said conveying means.

20. An absorption refrigerating system including a boiler, an absorber, means conveying weak solution from said boiler to said absorber, means for conveying the solution through said absorber and for promoting intimate contact between the solution and a gas to be absorbed, means for returning a part of the solution to said boiler, and means for cooling the remainder of the solution and for returning the same to the inlet to said absorber to again take part in the absorbing process.

21. An absorber adapted for use in an absorption refrigerating system of the type in which an inert gas is employed as a pressure equalizing medium, said absorber consisting of a hermitically sealed vessel disposed in an inclined position, and power driven means mounted within said vessel including a shaft mounted for rotation and a device on said shaft for causing inert gas, gas to be absorbed and absorption liquid to flow upwardly through said vessel, the arrangement being such that the gases and liquid are brought into intimate contact in said vessel as a result of the operation of said power driven means.

22. An absorber adapted for use in an absorption refrigerating system, said absorber consisting of a closed vessel, power driven means in said vessel for propelling absorption liquid through the vessel and for bringing gas and liquid into intimate contact therein, and power operated driving means for operating said power driven means, the arrangement being such that the vessel is hermetically sealed.

23. An absorber adapted for use in an absorption refrigerating system of the type in which an inert gas is employed as a pressure equalizing medium, said absorber consisting of a closed vessel, power driven means in said vessel for propelling absorption liquid through the vessel, for circulating inert gas therethrough and for bringing the inert gas, the gas to be absorbed and the absorption liquid into intimate contact therein, and power operated driving means for operating said power driven means.

24. An absorption refrigerating system having in combination, a boiler, an absorber extending above said boiler, conduits affording a path for the flow of absorption liquid between said boiler and said absorber and power driven means for driving the absorption liquid upwardly through said absorber in contact with gas to be absorbed whereby the liquid may flow by gravity from the upper portion of the absorber through the boiler and back to the level of the lower portion of the absorber.

25. An absorption refrigerating system including a boiler and an absorber extending above said boiler, conduits connecting the boiler and the absorber to form an absorption liquid circuit, power driven means within said absorber for lifting liquid from the level of the lower part of the absorber to the level of the upper part of the absorber so that it may flow by gravity through the boiler and back to the level of the lower part of the absorber.

CURTIS C. COONS.